United States Patent
Hong et al.

(10) Patent No.: US 11,233,332 B2
(45) Date of Patent: Jan. 25, 2022

(54) LIGHT ABSORBER

(71) Applicant: ELECTRONICS AND TELECOMMUNICATIONS RESEARCH INSTITUTE, Daejeon (KR)

(72) Inventors: Sunghoon Hong, Daejeon (KR); Hye Won Yoon, Chungcheongnam-do (KR); Mi Hyun Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 255 days.

(21) Appl. No.: 15/966,770

(22) Filed: Apr. 30, 2018

(65) Prior Publication Data

US 2018/0323512 A1 Nov. 8, 2018

(30) Foreign Application Priority Data

May 2, 2017 (KR) .......................... 10-2017-0056520
Sep. 5, 2017 (KR) .......................... 10-2017-0113543

(51) Int. Cl.
*H01Q 15/00* (2006.01)
*H01Q 5/10* (2015.01)
(Continued)

(52) U.S. Cl.
CPC ........... *H01Q 15/0086* (2013.01); *G02B 6/12* (2013.01); *H01Q 5/10* (2015.01); *H01Q 17/008* (2013.01);
(Continued)

(58) Field of Classification Search
CPC .... H01Q 15/0086; H01Q 17/008; H01Q 5/10; H01Q 9/0407; G02B 6/12; G02B 2006/12126
See application file for complete search history.

(56) References Cited

U.S. PATENT DOCUMENTS 7,253,017 B1 * 8/2007 Roscheisen ............ B82Y 30/00
136/250
8,750,653 B1 * 6/2014 Peters ........................ G01J 5/28
385/12
(Continued)

FOREIGN PATENT DOCUMENTS

CN 106483594 A 3/2017
KR 20150026366 A * 3/2015 ............. B82Y 40/00
(Continued)

OTHER PUBLICATIONS

Chou et al. "Three-dimensional cavity nanoantenna coupled plasmonic nanodots for ultrahigh and uniform surface-enhanced Raman scattering over large area", Optics Express, vol. 19, No. 5, Feb. 2011. (Year: 2011).*
(Continued)

*Primary Examiner* — Dimary S Lopez Cruz
*Assistant Examiner* — Bamidele A Jegede
(74) *Attorney, Agent, or Firm* — Rabin & Berdo, P.C.

(57) ABSTRACT

A light absorber includes an insulating substrate; a reflective layer that is provided on the insulating substrate, that is composed of a metal, and that has conductivity; a conductive pattern that is disposed on the reflective layer and that has defined therein at least one first opening; a nano-antenna that is disposed on the reflective layer and that vertically overlaps the at least one first opening; and an insulating pattern having a first portion that is interposed between the reflective layer and the conductive pattern and having a second portion that is interposed between and completely fills a vertical space between the reflective layer and the nano-antenna so that the reflective layer, the conductive pattern, and the nano-antenna are electrically insulated from each other.

14 Claims, 6 Drawing Sheets

(51) Int. Cl.
*G02B 6/12* (2006.01)
*H01Q 17/00* (2006.01)
*H01Q 9/04* (2006.01)

(52) U.S. Cl.
CPC . *G02B 2006/12126* (2013.01); *H01Q 9/0407* (2013.01)

(56) References Cited

U.S. PATENT DOCUMENTS

| | | | |
|---|---|---|---|
| 2005/0224790 A1* | 10/2005 | Jin | H01L 33/24 257/43 |
| 2006/0034729 A1* | 2/2006 | Poponin | G02B 5/204 422/82.05 |
| 2007/0070341 A1* | 3/2007 | Wang | G01J 3/44 356/301 |
| 2008/0088912 A1* | 4/2008 | Miles | G02B 26/0858 359/291 |
| 2009/0194160 A1* | 8/2009 | Chin | H01L 31/0687 136/256 |
| 2010/0112748 A1* | 5/2010 | Vidu | H01L 31/056 438/94 |
| 2010/0239794 A1* | 9/2010 | Andrews | H05K 3/046 428/32.72 |
| 2010/0277374 A1 | 11/2010 | Ju et al. | |
| 2010/0319759 A1* | 12/2010 | Fisher | H01L 31/073 136/252 |
| 2011/0069377 A1* | 3/2011 | Wu | G02B 1/007 359/356 |
| 2011/0214709 A1* | 9/2011 | Evelsizer | H01L 31/022425 136/244 |
| 2012/0170097 A1* | 7/2012 | Han | G02F 1/19 359/238 |
| 2012/0176766 A1* | 7/2012 | Natsumeda | B82Y 20/00 362/19 |
| 2012/0223869 A1 | 9/2012 | Kim et al. | |
| 2013/0014799 A1* | 1/2013 | Vidu | H01L 31/022425 136/244 |
| 2013/0092223 A1* | 4/2013 | Rampley | H01L 31/035281 136/256 |
| 2013/0115413 A1* | 5/2013 | Eres | G01N 21/658 428/120 |
| 2013/0125983 A1* | 5/2013 | Weiss | H01L 31/02366 136/259 |
| 2013/0148194 A1* | 6/2013 | Altug | G02B 5/008 359/350 |
| 2014/0045209 A1* | 2/2014 | Chou | G01N 21/59 435/34 |
| 2014/0085693 A1* | 3/2014 | Mosallaei | G06E 3/00 359/107 |
| 2014/0104135 A1* | 4/2014 | Delestre | H01Q 9/0407 343/893 |
| 2014/0154668 A1* | 6/2014 | Chou | B82Y 15/00 435/5 |
| 2014/0158198 A1* | 6/2014 | Simovski | H01L 31/0543 136/259 |
| 2015/0063739 A1* | 3/2015 | Long | G02F 1/0333 385/1 |
| 2015/0253321 A1* | 9/2015 | Chou | G01N 33/54386 435/5 |
| 2015/0255639 A1* | 9/2015 | Pelouard | H01L 27/142 136/246 |
| 2015/0338346 A1* | 11/2015 | Chou | B82Y 15/00 435/287.2 |
| 2015/0357504 A1* | 12/2015 | Chen | H01L 31/028 257/27 |
| 2015/0372175 A1* | 12/2015 | Yu | H01L 31/18 250/338.4 |
| 2016/0003817 A1* | 1/2016 | Chou | G01N 21/6486 435/6.11 |
| 2016/0223843 A1* | 8/2016 | Park | B82Y 20/00 |
| 2016/0370568 A1* | 12/2016 | Toussaint | C03C 17/3649 |
| 2017/0301810 A1* | 10/2017 | Dutta | H01L 31/18 |

FOREIGN PATENT DOCUMENTS

| | | | |
|---|---|---|---|
| KR | 10-1521211 B1 | 5/2015 | |
| KR | 20150090035 A * | 8/2015 | H01L 31/108 |
| KR | 10-2017-0012672 A | 2/2017 | |

OTHER PUBLICATIONS

Li et al., "Three-dimensional cavity nanoantenna coupled plasmonic nanodots for ultrahigh and uniform surface-enhanced Raman scattering over large area", vol. 19, No. 5, Optics Express, Feb. 28, 2011.*

Wang et al., "Directional Raman Scattering from Single Molecules in the Feed Gaps of Optical Antennas", American Chemical Society, Nano Letter 2013, 13, 2194-2198 (Year: 2013).*

Caldwell et al., "Plasmonic Nanopillar Arrays for Large Area, High-Enhancement Surface Enhanced Raman Scattering Sensors", American Chemical Society, ACSNANO, vol. 5, No. 5, 4046-4055 (Year: 2011).*

Wang et al., "High Directivity Optical Antenna Substrates for Surface Enhanced Raman Scattering", Advanced Materials 2012, 24, 4376-4380 (Year: 2012).*

Donda et al., "Bilayered nanoantenna design improves the performance of silicon metasurfaces in the visible-wavelength region", Journal of Nanophotonics, vol. 11(4) (Year: 2017).*

* cited by examiner

LIGHT ABSORBER

CROSS-REFERENCE TO RELATED APPLICATIONS

This U.S. non-provisional patent application claims priority under 35 U.S.C. § 119 of Korean Patent Application Nos. 10-2017-0056520, filed on May 2, 2017, and 10-2017-0113543, filed on Sep. 5, 2017, the entire contents of which are hereby incorporated by reference.

BACKGROUND

The present disclosure relates to a light absorber, and more particularly to a meta-material-based light absorber having absorption characteristics for light in multiple wavelength bands.

By using an artificial structure smaller than the wavelength of light, light incident on the material may be controlled. A material made up of a collection of these artificial structures is called a metamaterial. Metamaterials consist of a collection of composite elements formed from common materials such as plastics and metals. If the structures in the material are smaller than the wavelength of light, since the light incident on the material is affected by the distribution of the approximate refractive index on average, metamaterials are typically arranged in a repeating pattern. That is, the optical properties of a metamaterial are generated by its structure and arrangement, not by the properties of its constituent materials.

Recently, as the demand for advanced ICT devices such as the Internet of Things and wearable devices increases, researches on metamaterials that exceed the characteristics of existing materials are actively carried out. Through metamaterial manufacturing technology, materials with optical properties that have not yet been found in nature may be realized. The properties of the metamaterial may be easily adjusted by controlling the shape, size, orientation, and arrangement of the metamaterial, so that it may be applied to a wide range of fields. Recently, various studies have been conducted to apply metamaterial to energy harvesting technology. In order to apply the metamaterial to various fields, it is necessary to study the metamaterial which has absorption characteristics for wavelengths of multiple bands, has high integration, and is easy to be manufactured.

SUMMARY

The present disclosure is to provide a metamaterial-based light absorber with absorption characteristics for light of multiple wavelength bands.

An embodiment of the inventive concept provides a light absorber including: a reflective layer having conductivity; a conductive pattern disposed on the reflective layer and including at least one first opening; a nano-antenna disposed on the reflective layer and vertically overlapping the first opening; and an insulating pattern interposed between the reflective layer and the conductive pattern and between the reflective layer and the nano-antenna, wherein the reflective layer, the conductive pattern, and the nano-antenna are electrically insulated from each other.

In an embodiment, the nano-antenna may have a shape corresponding to the first opening.

In an embodiment, a width of the nano-antenna may be equal to a width of the first opening.

In an embodiment, the first opening may have a width of 1 nm to 300 nm, and the conductive pattern may be configured to selectively transmit light incident toward the conductive pattern according to a wavelength.

In an embodiment, the first opening may have a first width in a first direction and a second width in a second direction perpendicular to the first direction, wherein the first width and the second width may be 1 nm to 300 nm, and the first width may be different from the second width.

In an embodiment, the first opening may traverse the conductive pattern in a first direction, and a width of the first opening in a second direction perpendicular to the first direction may be 1 nm to 300 nm.

In an embodiment, a distance between the reflective layer and the nano-antenna may be greater than a distance between the reflective layer and the conductive pattern.

In an embodiment, the insulating pattern may include: a lower insulating pattern disposed between the reflective layer and the conductive pattern; and an upper insulating pattern penetrating the first opening and protruding from the lower insulating pattern.

In an embodiment, the nano-antenna may be disposed on an upper surface of the upper insulating pattern, and sides of the nano-antenna may be aligned with sides of the upper insulating pattern.

In an embodiment, the nano-antenna may have the same thickness substantially as the conductive pattern.

In an embodiment, a distance between the reflective layer and the nano-antenna may be less than a distance between the reflective layer and the conductive pattern.

In an embodiment, the insulating pattern may include a first depression formed below the first opening, and the nano-antenna may be disposed on a bottom surface of the first depression.

In an embodiment, the nano-antenna may include: a first antenna part having a second opening; and a second antenna part spaced apart from the first antenna part and vertically overlapping the second opening.

In an embodiment, the first antennal part may have a ring shape.

In an embodiment, the second antenna part may have a shape corresponding to the second opening.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Advantages and features of the inventive concept, and implementation methods thereof will be clarified through following embodiments described with reference to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art. Further, the inventive concept is only defined by scopes of claims. Like reference numbers refer to like elements throughout the entire specification.

The terms used herein is to describe the embodiments and are not intended to limit the inventive concept. The terms of a singular form may include plural forms unless referred to the contrary. The meaning of "include," "comprise," "including," or "comprising," specifies a property, a region, a fixed number, a step, a process, an element and/or a component but does not exclude other properties, regions, fixed numbers, steps, processes, elements and/or components.

A light absorber according to embodiments of the inventive concept will now be described in detail with reference to the drawings.

Figure 1:
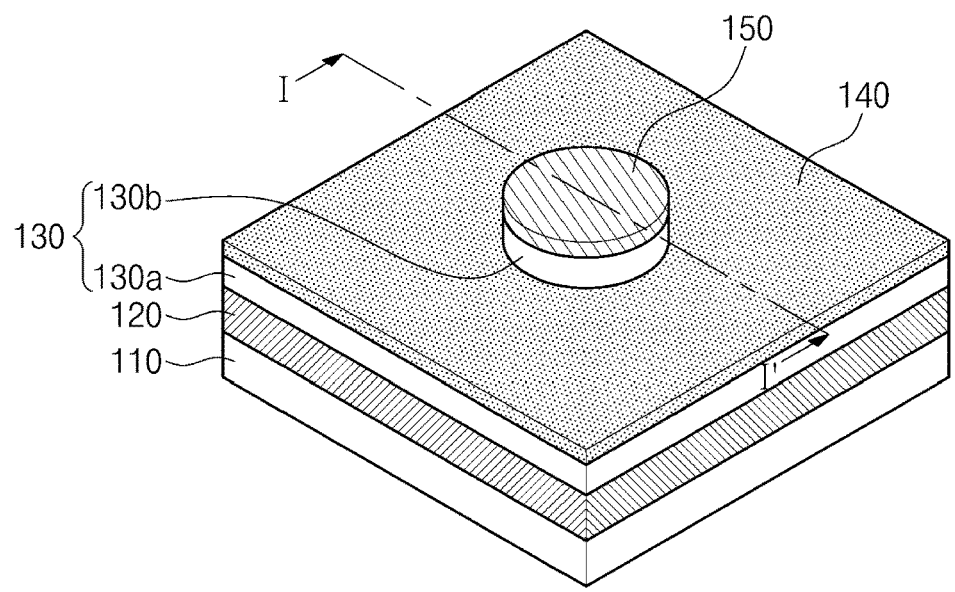
FIG. 1 is a perspective view illustrating a light absorber according to embodiments of the inventive concept.
Figure 2:
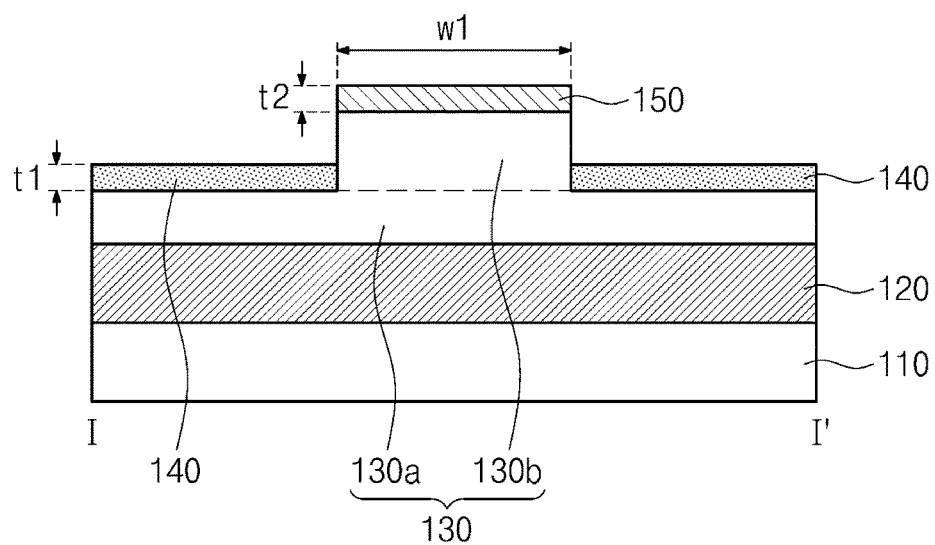
FIG. 2 is a cross-sectional view taken along the line I-I' of FIG. 1 for explaining a light absorber according to embodiments of the inventive concept.
Figure 3A:
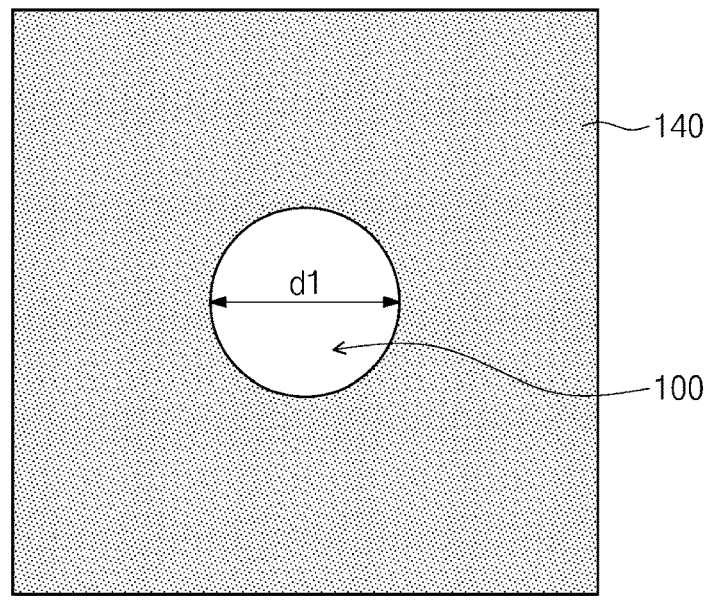
FIGS. 3A to 3C are views for explaining a conductive pattern according to embodiments of the inventive concept.
Figure 3B:
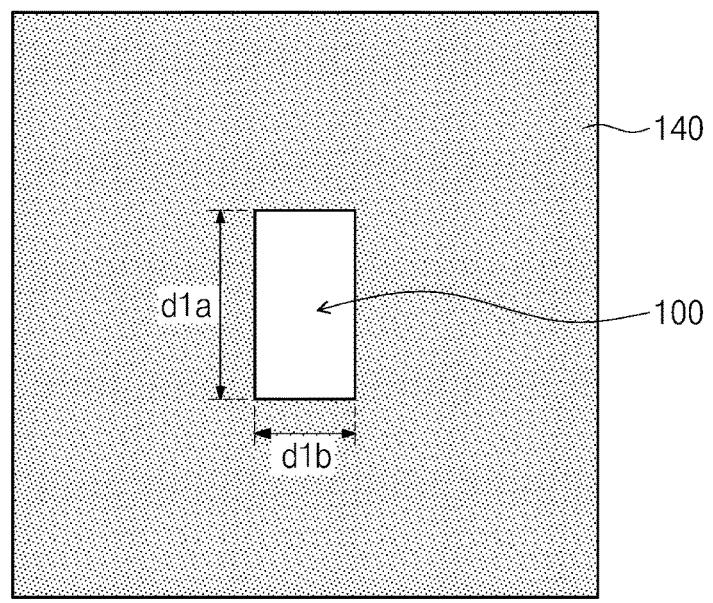
Figure 3C:
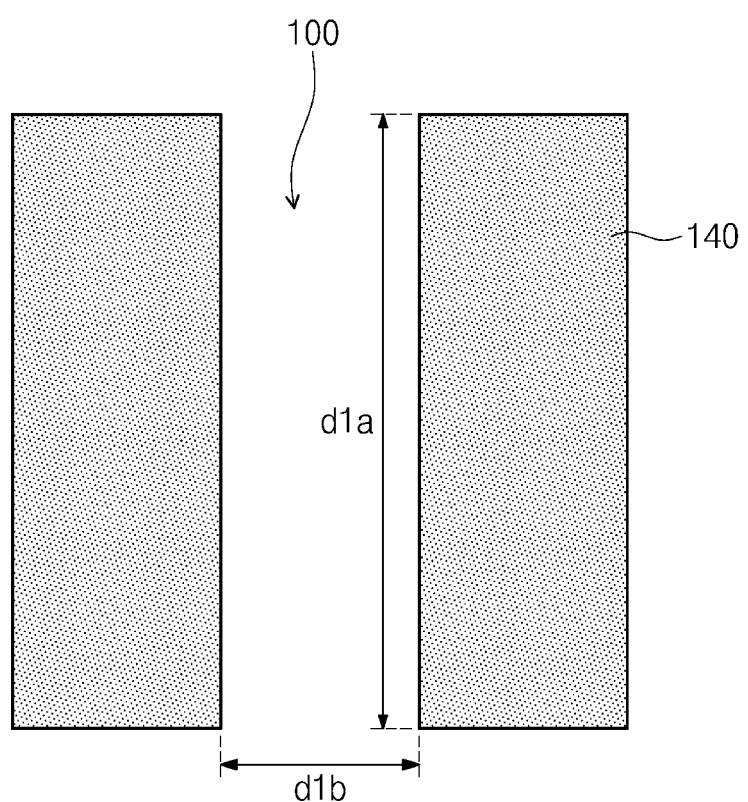

FIG. 1 is a perspective view illustrating a light absorber according to embodiments of the inventive concept. FIG. 2 is a cross-sectional view taken along the line I-I' of FIG. 1 for explaining a light absorber according to embodiments of the inventive concept. FIGS. 3A to 3C are views for explaining a conductive pattern according to embodiments of the inventive concept.

Referring to FIGS. 1 to 3C, a light absorber may include a reflective layer 120, an insulating pattern 130, a conductive pattern 140, and a nano-antenna 150. The nano-antenna 150 and the reflective layer 120 may be spaced apart from each other with the insulating pattern 130 interposed therebetween. The nano-antenna 150 may receive light of a specific wavelength from the outside of the light absorber and output it toward the reflective layer 120. The light outputted toward the reflective layer 120 may be resonated between the nano-antenna 150 and the reflective layer 120 to be absorbed by the light absorber.

The conductive pattern 140 may be spaced apart from the reflective layer 120 with the insulating pattern 130 therebetween. The conductive pattern 140 may selectively transmit light according to the wavelength. The light transmitted through the conductive pattern 140 may be resonated between the conductive pattern 140 and the reflective layer 120 and absorbed by the light absorber. In addition, the conductive pattern 140 may be disposed between the reflective layer 120 and the nano-antenna 150 to control the resonance characteristics between the nano-antenna 150 and the reflective layer 120. Accordingly, the light absorber may have absorption characteristics for light of multiple wavelength bands.

In particular, the reflective layer 120 may have a continuous shape that does not include openings and depressions. For example, the reflective layer 120 may have the form of a flat plate. The reflective layer 120 may include a conductive material. For example, the reflective layer 120 may include a metal. The reflective layer 120 may be electrically floated. That is, the reflective layer 120 may not be grounded and may not be connected to an external power source. The support substrate 110 may be disposed under the reflective layer 120. The support substrate 110 may include a dielectric. For example, the support substrate 110 may include a silicon substrate, a polymer substrate, a glass substrate, or the like. However, the inventive concept is not limited thereto. The support substrate 110 may be omitted.

The conductive pattern 140 may be disposed on the reflective layer 120. The thickness t1 of the conductive pattern 140 may be 0.1 nm to 100 nm. The conductive pattern 140 may include a metal. For example, the conductive pattern 140 may include at least one of silver (Ag), aluminum (Al), gold (Au), and platinum (Pt). The conductive pattern 140 may be spaced apart from the reflective layer 120 and may be electrically isolated from the reflective layer 120.

As shown in FIG. 3A, the conductive pattern 140 may include a first opening 100. The conductive pattern 140 may selectively transmit light of a specific wavelength through the first opening 100. Specifically, the width d1 of the first opening 100 may be 10 nm to 300 nm. As the first opening 100 has a width of 10 nm to 300 nm, the conductive pattern 140 may selectively transmit light of the 350 nm to 900 nm wavelength band. The selective transmission of light of a specific wavelength by the conductive pattern 140 may be caused by an extraordinary optical transmission (EOT) phenomenon. The EOT phenomenon may mean a phenomenon in which light of a specific wavelength band is transmitted through a metal film including an opening having a width smaller than the wavelength of light. Specifically, light may be incident on the upper surface of a metal film including a fine opening to cause constructive interference due to a surface plasmon resonance effect. Then, plasmons may pass through the opening and emit on the lower surface of the metal film.

The first opening 100 may have a circular shape in plan view. That is, the width d1 of the first opening 100 may be the same for all directions in plan view. Accordingly, the light transmission characteristic of the conductive pattern 140 may not be affected by the polarization direction.

Meanwhile, according to another embodiment, as shown in FIG. 3B, the first opening 100 of the conductive pattern 140 may have a rectangular shape in plan view. In this case, the first opening 100 may have a first width d1$a$ in the first direction and a second width d1$b$ in the second direction perpendicular to the first direction. In one example, the first opening 100 may be rectangular in plan view. That is, the first width d1$a$ and the second width d1$b$ may be different from each other. At this time, the first width d1$a$ and the second width d1$b$ may be 1 nm to 300 nm. As the first opening 100 includes different first widths d1$a$ and second widths d1$b$, the conductive pattern 140 may selectively transmit specific light of different wavelengths according to the polarization direction.

According to another embodiment, the first opening 100 of the conductive pattern 140 may traverse the conductive pattern 140, as shown in FIG. 3C. In other words, the first width d1$a$ of the first opening 100 may be equal to the width of the conductive pattern 140 in the first direction. The second width d1$b$ of the first opening 100 may be between 1 nm and 300 nm. Therefore, the conductive pattern 140 may not transmit specific light or transmit specific light depending on the polarization direction.

Referring again to FIGS. 1 to 3, the nano-antenna 150 may be disposed on the reflective layer 120. The nano-antenna 150 may be vertically overlapped with the first opening 100. The nano-antenna 150 may have a shape corresponding to the first opening 100 of the conductive pattern 140 in plan view. In other words, the nano-antenna 150, in plan view, may have substantially the same shape as the first opening 100 of the conductive pattern 140. For example, when the conductive pattern 140 includes the first opening 100 described with reference to FIG. 3A, the nano-antenna 150 may have a circular shape in plan view. For example, when the conductive pattern 140 includes the first opening 100 described with reference to FIG. 3B or FIG. 3C, the nano-antenna 150 may have a square or rectangular shape in plan view. The thickness t2 of the nano-antenna 150 may be 0.1 nm to 100 nm. The thickness t2 of the nano-antenna 150 may be substantially the same as the thickness t1 of the conductive pattern 140. The nano-antenna 150 may include the same material as the conductive pattern 140.

The insulating pattern 130 may be disposed between the reflective layer 120 and the conductive pattern 140 and may also be disposed between the reflective layer 120 and the nano-antenna 150. The insulating pattern 130 may electrically isolate the reflective layer 120, the conductive pattern 140, and the nano-antenna 150 from one another. The insulating pattern 130 may include silicon oxide (SiO2) or a polymer.

In particular, the insulating pattern 130 may include a lower insulating pattern 130a and an upper insulating pattern 130b. The lower insulating pattern 130a may be disposed between the reflective layer 120 and the conductive pattern 140. The lower insulating pattern 130a may have the form of a flat plate having upper and lower surfaces opposed to each other. The lower insulating pattern 130a may support the conductive pattern 140 disposed on the upper surface of the lower insulating pattern 130a.

The upper insulating pattern 130b may protrude from the upper surface of the lower insulating pattern 130a. The upper insulating pattern 130b may penetrate the conductive pattern 140. For example, the width of the upper insulating pattern 130b may be the same as the width d1 of the first opening 100 of the conductive pattern 140. The upper insulating pattern 130b may have a constant width and extend in a direction away from the lower insulating pattern 130a. Thus, the upper insulating pattern 130b may have the same shape as the first opening 100 of the conductive pattern 140 in plan view. The upper insulating pattern 130b may have upper and lower surfaces opposite to each other. The upper insulating pattern 130b may support the nano-antenna 150 disposed on the upper surface of the upper insulating pattern 130b.

Figure 4:
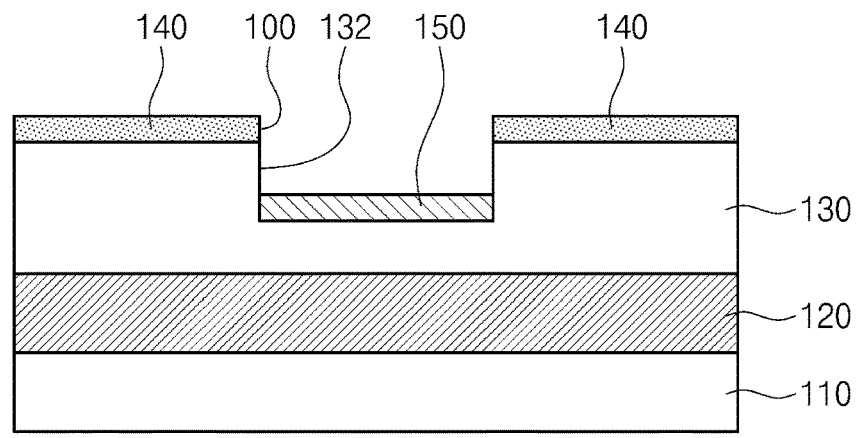
FIG. 4 is a cross-sectional view illustrating a light absorber according to another embodiment of the inventive concept.

FIG. 4 is a cross-sectional view illustrating a light absorber according to another embodiment of the inventive concept. The same reference numerals are given to the same components as those of the light absorber described with reference to FIGS. 1 to 3C, and redundant explanations may be omitted for simple explanation.

Referring to FIG. 4, the nano-antenna 150 may be disposed between the reflective layer 120 and the conductive pattern 140. That is, the distance between the reflective layer 120 and the nano-antenna 150 may be less than the distance between the reflective layer 120 and the conductive pattern 140. The nano-antenna 150 may receive light of a specific wavelength transmitted through the conductive pattern 140, and resonate and absorb light of a specific wavelength.

Specifically, the insulating pattern 130 may include a first depression 132 that is recessed from the upper surface of the insulating pattern 130 toward the lower surface of the insulating pattern 130. The first depression 132 may have a constant width. The first depression 132 may be formed below the first opening 100 and the inner surfaces of the first depression 132 may be aligned with the inner surfaces of the first opening 100. That is, although not shown, the first depression 132 may have the same shape as the first opening 100 in plan view.

The nano-antenna 150 may be disposed on the bottom surface of the first depression 132 and the conductive pattern 140 may be disposed on the upper surface of the insulating pattern 130. The shapes of the nano-antenna 150 and the conductive pattern 140 and the material of the nano-antenna 150 and the conductive pattern 140 are the same as those described with reference to FIGS. 1 to 3C, and thus a detailed description thereof will be omitted.

Figure 5:
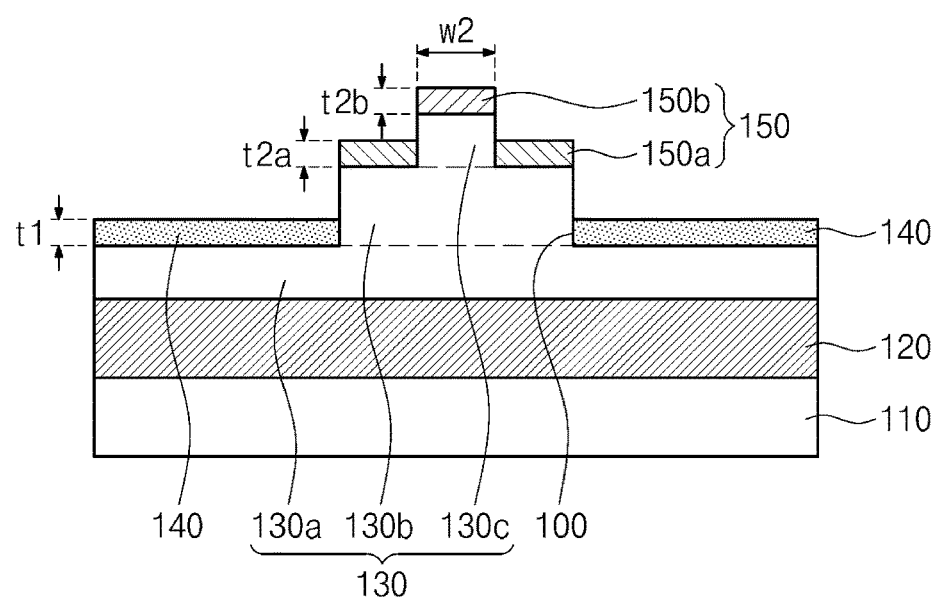
FIG. 5 is a cross-sectional view illustrating a light absorber according to other embodiments of the inventive concept.
Figure 6:
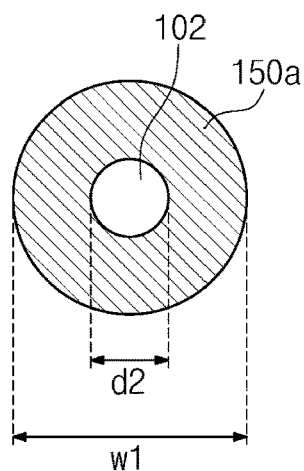
FIG. 6 is a view for explaining a first antenna part according to embodiments of the inventive concept.

FIG. 5 is a cross-sectional view illustrating a light absorber according to other embodiments of the inventive concept. FIG. 6 is a view for explaining a first antenna part according to embodiments of the inventive concept. The same reference numerals are given to the same components as those of the light absorber described with reference to FIGS. 1 to 3C, and redundant explanations may be omitted for simple explanation.

Referring to FIG. 5, the nano-antenna 150 may include a first antenna part 150a and a second antenna part 150b spaced from each other. As shown in FIG. 6, the first antenna part 150a may include a second opening 102. The second antenna part 150b may be vertically overlapped with the second opening 102. Accordingly, the nano-antenna 150 may receive light of wavelengths of multiple bands.

In particular, the insulating pattern 130 may include a lower insulating pattern 130a and an upper insulating pattern 130b, as described with reference to FIG. 2. The insulating pattern 130 may further include an uppermost insulating pattern 130c protruding from the upper insulating pattern 130b. The uppermost insulating pattern 130c may penetrate the second antenna part 150b. The uppermost insulating pattern 130c may have a constant width and extend in a direction away from the upper insulating pattern 130b. The uppermost insulating pattern 130c may be disposed below the second antenna part 150b to support the second antenna part 150b.

The first antenna part 150a of the nano-antenna 150 may be disposed on the upper surface of the upper insulating pattern 130b. The first antenna part 150a may have a ring shape, as shown in FIG. 6. The width (or outer diameter) w1 of the first antenna part 150a may be the same as the width of the first opening 100. For example, the width w1 of the first antenna part 150a may be between 1 nm and 300 nm. The first antenna part 150a may selectively receive light of the first wavelength.

The first antenna part 150a may selectively transmit light of a specific wavelength through the second opening 102. The second opening 102 may have a width to generate specific light transmission. For example, the width d2 of the second opening 102 may be 0.5 nm to 100 nm. In this example, although the second opening 102 is shown as being circular in plan view, embodiments of the inventive concept are not limited thereto. In another example, the shape of the second opening 102 may be the same as/similar to the first opening 100 described with reference to FIG. 3B. That is, the first antenna part 150a may have different light transmission characteristics depending on the polarization direction.

The second antenna part 150b of the nano-antenna 150 may be disposed on the upper surface of the uppermost insulating pattern 130c. The second antenna part 150b may be vertically overlapped with the second opening 102. The second antenna part 150b may have a shape corresponding to the second opening 102. That is, the second antenna part 150b may have substantially the same shape as the second opening 102 in plan view. The thickness t2b of the second antenna part 150b may be equal to the thickness t2a of the first antenna part 150a. The width w2 of the second antenna part 150b may be smaller than the width w1 of the first antenna part 150a. For example, the width of the second antenna part 150b may be between 0.5 nm and 100 nm. Accordingly, the second antenna part 150b may selectively receive the light of the second wavelength shorter than the first wavelength.

Figure 7:
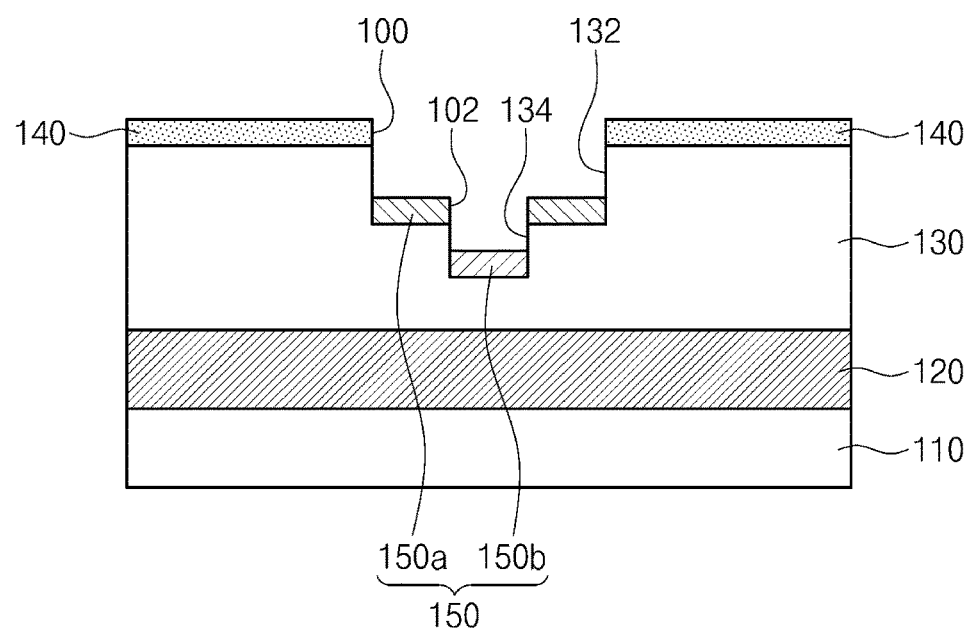
FIG. 7 is a cross-sectional view illustrating a light absorber according to other embodiments of the inventive concept.

FIG. 7 is a cross-sectional view illustrating a light absorber according to other embodiments of the inventive concept. The same reference numerals are given to the same components as those of the light absorber described with reference to FIGS. 1 to 6, and redundant explanations may be omitted for simple explanation.

Referring to FIG. 7, the nano-antenna 150 may be disposed between the reflective layer 120 and the conductive pattern 140. At this time, the distance between the reflective layer 120 and the first antenna part 150a may be greater than the distance between the reflective layer 120 and the second antenna part 150b. The conductive pattern 140 may selectively transmit light incident from the outside of the light absorber toward the upper side of the light absorber according to the wavelength. Then, the first antenna part 150a may absorb a portion of the light transmitted through the conductive pattern 140. The first antenna part 150a may reflect another part of the light transmitted through the conductive pattern 140. In addition, the first antenna part 150a may transmit another portion of the light transmitted through the conductive pattern 140 through the second opening 102. The second antenna part 150b may absorb a portion of the light passing through the second opening 102. In addition, the second antenna part 150b may reflect another portion of the light passing through the second opening 102.

In particular, the insulating pattern 130 may include the first depression 132 described with reference to FIG. 4. The insulating pattern 130 may further include a second depression 134 recessed from a bottom surface of the first depression 132 toward a lower surface of the insulating pattern 130. The first antenna part 150a may be disposed on the bottom surface of the first depression 132. The second antenna part 150b may be disposed on the bottom surface of the second depression 134. The second depression 134 may have a constant width. The second depression 134 may be formed below the second opening 102 and the inner surfaces of the second depression 134 may be aligned with the inner surfaces of the second opening 102. That is, although not shown, the second depression 134 may have the same shape as the second opening 102 in plan view.

Figure 8:
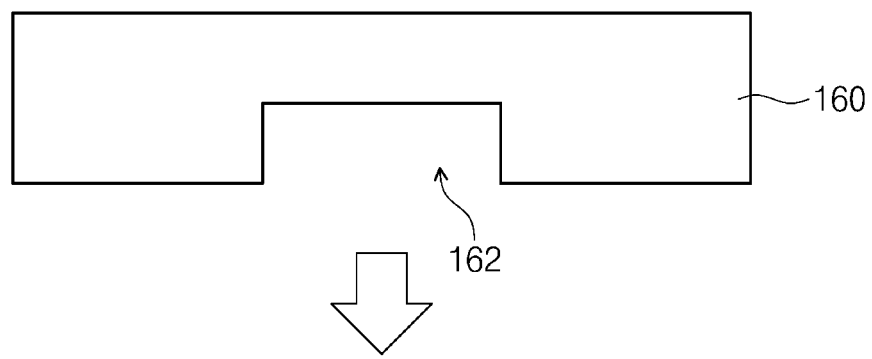
FIGS. 8 and 9 are views for explaining a method of manufacturing a light absorber according to embodiments of the inventive concept.
Figure 9:
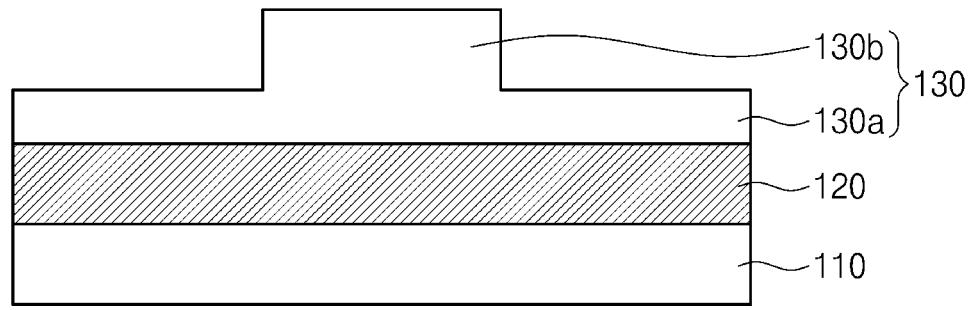

FIGS. 8 and 9 are views for explaining a method of manufacturing a light absorber according to embodiments of the inventive concept.

Referring to FIGS. 8 and 9, a reflective layer 120 and a resin layer 135 may be sequentially formed on a support substrate 110. For example, the resin layer 135 may include a polymer. The resin layer 135 may include a curable resin that is cured by ultraviolet rays and/or heat.

Thereafter, the pattern may be transferred to the resin layer 135 by performing a nanoimprint process on the resin layer 135. Specifically, the resin layer 135 may be pressed using the stamp 160. The stamp 160 may be a stamp for a nanoimprint having a predetermined pattern. Then, the resin layer 135 may be cured to form the insulating pattern 130. Curing of the resin layer 135 may include ultraviolet irradiation and/or heat treatment.

For example, as shown in FIG. 8, the stamp 160 may include grooves 162 recessed from the lower surface of the stamp 160 toward the upper surface of the stamp 160. While pressing the resin layer 135 with the stamp 160, a part of the resin layer 135 may be filled into the inside of the groove 162 and another part of the resin layer 135 may remain outside the groove 162. A part of the resin layer 135 remaining outside the groove 162 may be cured to form the lower insulating pattern 130a. Another part of the resin layer 135 filled in the groove 162 may be cured to form the upper insulating pattern 130b.

Referring again to FIG. 2, a deposition process may be performed on the insulating pattern 130 to form the nano-antenna 150 and the conductive pattern 140. The deposition process may include a sputtering process or an electron beam deposition process. The nano-antenna 150 and the conductive pattern 140 may be formed by the same deposition process. Accordingly, the nano-antenna 150 and the conductive pattern 140 may have the same thickness and may include the same material.

According to embodiments of the inventive concept, a metamaterial-based light absorber having absorption characteristics for multiple wavelength bands, easy to manufacture, and applicable to various energy devices may be provided.

Although the exemplary embodiments of the inventive concept have been described, it is understood that the inventive concept should not be limited to these exemplary embodiments but various changes and modifications can be made by one ordinary skilled in the art within the spirit and scope of the inventive concept as hereinafter claimed.

What is claimed is:

1. A light absorber, comprising:
  an insulating substrate;
  a reflective layer that is provided on the insulating substrate, that is comprised of a metal, and that has conductivity;
  an insulating pattern that is comprised of an insulating material and that has a first portion which is disposed on and completely covers the reflective layer, a second portion which extends upwardly from the first portion, and a third portion which extends upwardly from the second portion;
  a conductive pattern that is disposed on the first portion of the insulating pattern and that has defined therein a first opening through which the second portion of the insulating pattern vertically extends to completely fill the first opening; and
  a first nano-antenna that is disposed on and covers an upper surface of the second portion of the insulating pattern to extend over the reflective layer and to vertically overlap the first opening, the first antenna defining therein a second opening; and
  a second nano-antenna that is disposed on and covers an upper surface of the third portion of the insulating pattern to extend over the reflective layer and to vertically overlap the second opening,
  wherein the reflective layer, the conductive pattern, the first nano-antenna, and the second nano-antenna are electrically insulated from each other by the insulating pattern.

2. The light absorber of claim 1, wherein the first nano-antenna has a width that is equal to that of the first opening.

3. The light absorber of claim 1, wherein the first opening has a width ranging from 1 nm to 300 nm, and the conductive pattern is configured to selectively transmit incident light toward the conductive pattern according to a wavelength.

4. The light absorber of claim 1, wherein the first opening has a first width in a first direction and a second width in a second direction that is perpendicular to the first direction, and wherein the first width and the second width range from 1 nm to 300 nm, and the first width is different from the second width.

5. The light absorber of claim 1, wherein the first opening traverses the conductive pattern in a first direction, and the at least one first opening has a width in a second direction that is perpendicular to the first direction and that ranges from 1 nm to 300 nm.

6. The light absorber of claim 1, wherein the reflective layer and the first nano-antenna are separated by a first distance, the reflective layer and the conductive pattern are separated by a second distance, and the first distance is greater than the second distance.

7. The light absorber of claim 1, wherein the first nano-antenna has sides that are aligned with sides of the second portion of the insulating pattern.

8. The light absorber of claim 1, wherein the first nano-antenna has a thickness that is substantially the same as that of the conductive pattern.

9. The light absorber of claim 1, wherein the reflective layer and the first nano-antenna are separated by a first distance, the reflective layer and the conductive pattern are separated by a second distance, and the first distance is less than the second distance.

10. The light absorber of claim 1, wherein the first nano-antenna has a ring shape.

11. The light absorber of claim 10, wherein the second nano-antenna has a shape corresponding to that of the second opening.

12. The light absorber of claim 1, wherein a side surface of the first nano-antenna is vertically aligned with a side surface of the second portion of the insulating pattern.

13. A light absorber, comprising:
an insulating substrate;
a reflective layer that is provided on the insulating substrate, that is comprised of a metal, and that has conductivity;
an insulating pattern that is comprised of an insulating material, that is disposed on and completely covers the reflective layer, and that has defined therein a first opening that is a depression which does not expose the reflective layer;
a first nano-antenna that is disposed on the insulating pattern within the first opening, the first nano-antenna defining therein a second opening that is a further depression within the insulating pattern that does not expose the reflective layer;
a second nano-antenna that is spaced apart from the first nano-antenna and that is disposed within the second opening; and
a conductive pattern that is disposed on an upper surface of the insulating pattern except over the first nano-antenna and the second nano-antenna,
wherein the reflective layer, the conductive pattern, the first nano-antenna, and the second nano-antenna are electrically insulated from each other by the insulating pattern.

14. The light absorber of claim 13, wherein the first nano-antenna has a ring shape.

* * * * *